May 26, 1953 C. R. LARKIN Re. 23,662

BARBECUE APPLIANCE

Original Filed Aug. 30, 1949 2 Sheets-Sheet 1

INVENTOR.
CHARLES R. LARKIN
BY H. G. Burns
ATTORNEY

INVENTOR.
CHARLES R. LARKIN
BY A. G. Burns
ATTORNEY

Reissued May 26, 1953 Re. 23,662

UNITED STATES PATENT OFFICE 23,662

BARBECUE APPLIANCE

Charles R. Larkin, Toledo, Ohio, assignor of one-half to Glen M. Larkin, Quincy, Mich.

Original No. 2,545,818, dated March 20, 1951, Serial No. 113,067, August 30, 1949. Application for reissue June 25, 1952, Serial No. 295,597

8 Claims. (Cl. 99—421)

Matter enclosed in heavy brackets [ ] appears in the original patent but forms no part of this reissue specification; matter printed in italics indicates the additions made by reissue.

This invention relates to improvements in a barbecue appliance adapted for mass roasting of various articles of food such as wienerwursts, frankfurters, spareribs, and other meats and foodstuffs generally.

One object of the invention is to afford an appliance having a heater, a drive-shaft provided with activating means to rotate it and a removable rack disposed on the shaft provided with numerous spits for the reception of individual particles of food to be roasted.

Another object of the invention is to construct the appliance so the revolving rack is continuously rotated and on which the food particles are readily positioned on the spits or removed therefrom during rotation of the rack, so the supply of the food particles to the rack and their removal is continuous.

Another object of the invention is to construct the rack so that it is readily removable from the drive-shaft bodily and replaceable by another similar rack at any time, thus to permit loading of the rack completely or partially with food particles and removal of the rack after the roasting operation shall have been completed.

A further object of the invention is the provision of interchangeable food-carrying racks by which is permitted loading of the racks with the particles to be barbecued preliminary to insertion of the loaded racks into the roasting appliance, and their removal after the roasting operation shall have been completed, and replacement of the removed rack with another loaded rack whereby the capacity of the appliance is augmented.

And a still further object of the invention is to construct the device so that the entire surface of each of the individual food particles, while disposed on the rack, are subjected to radiant heat during each revolution of the rack, thus to insure uniformity of the roasting operation.

Other objects and advantages of the invention appear in the following description.

An illustrative embodiment of the invention is shown in the accompanying drawings, in which.

Figure 1:
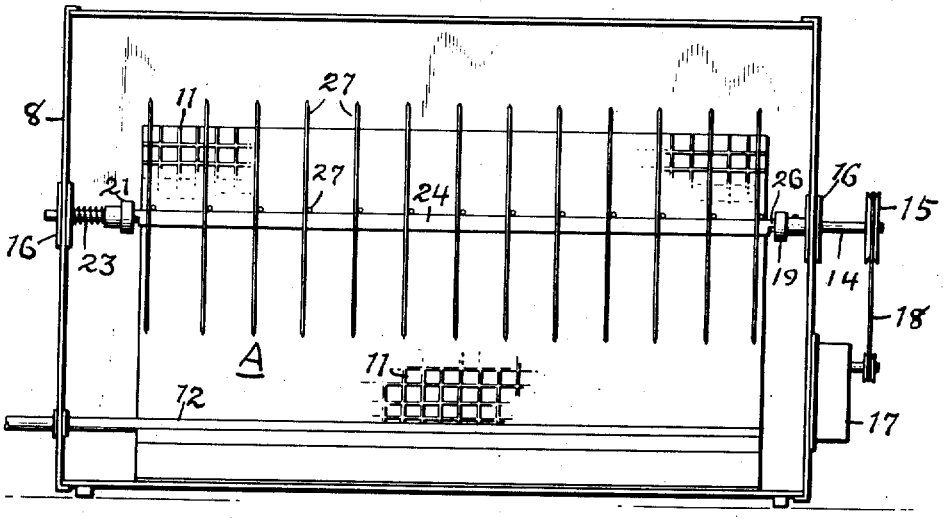
Fig. 1 is a front elevational view of an appliance in which the invention is incorporated.

The invention consists of a housing 8, constituting an oven, having glazed windows 9 in each end thereof, the front 10 of the housing being open. In the back of the housing is positioned a grid 11 preferably formed of fire clay, and along the front of the grid at the lower end thereof is disposed a gas pipe 12 perforated at intervals for the outlet of gas which when ignited forms jets 13 by which to heat the grid.

A rotatable drive-shaft 14 extends horizontally, on one of its projecting ends of which is secured a belt pulley 15, there being bearings 16 on each end of the housing for support of the drive-shaft. A motor 17, mounted upon the exterior wall on the end of the housing, is connected with the pulley 15 by means of a belt 18 by which the shaft is activated.

Figure 5:
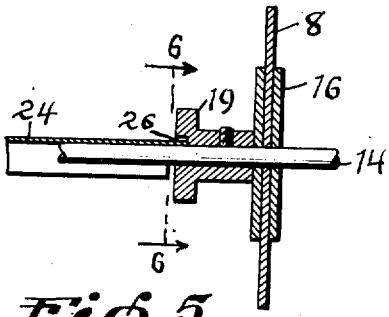
Fig. 5 is a similar view of another support for the opposite end of the food rack.
Figure 7:
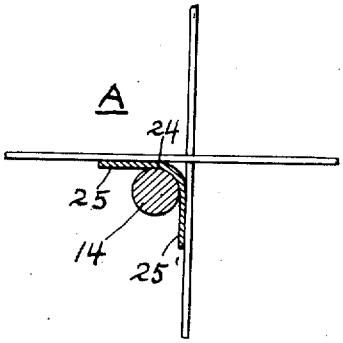
Fig. 7 is a fragmentary end elevational view of the food rack positioned on a drive-shaft therefor, shown in section through a midportion thereof.
Figure 6:
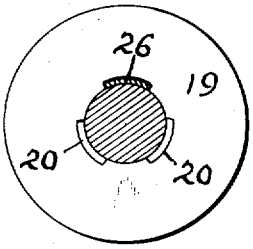
Fig. 6 is a cross-sectional view of Fig. 5 on the line 6—6 thereof.

On the drive-shaft, adjacent one end wall of the housing, is secured a chuck 19 (Figs. 1, 5 and 6) having therein an annular series of recesses 20 arranged concentrically about the drive-shaft, and upon the opposite end portion of the drive-shaft is loosely disposed a retaining lug 21 having in its inner end an annular recess 22 that encompasses the drive-shaft, and interposed between said lug and the bearing 16 on the adjacent end wall is disposed a concentric compression spring 23 that acts to axially move the lug inwardly on the drive-shaft. The purposes of the chuck and the retaining lug appear hereinafter.

A food rack, shown generally by A, is provided which consists of an angle bar 24 having flanges 25—25' that extend at right angles to each other, and having at each end an extending tongue 26—26'. Preferably, the longitudinal midportion of the angle bar along the juncture of its flanges is shaped arcuately to fit the curvature of the drive-shaft 14 so as to fit snugly thereon, and the tongues on the ends of the bar are adapted to be entered selectively into one of the recesses 20 in the chuck 19, or the annular recess in the retaining lug 21, the food rack being adapted to be reversed in position lengthwise as it is being placed in the oven. The food rack is secured in operating position on the drive-shaft by first inserting the tongue 26' on the angle bar into the recess 22, thrusting the angle bar 24 endwise against the retaining lug 21 in opposition to the spring 23, sufficiently to allow the angle bar to snugly straddle the drive-shaft and permit the tongue 26 to enter one of the recesses 20 in the chuck, which occurs upon release of the food rack by the operator, due to reaction of the spring 23. When the food rack is thus placed in operating position it rotates together with the drive-shaft as the latter is activated by the motor.

Upon the angle-bar 24 are secured a series of spits 27 arranged in pairs spaced apart, the spits of each pair being disposed at right angles to each other and secured to the corresponding flanges 25—25' of the angle bar, preferably by spot welding the spits to the corresponding flanges. The spits are of uniform length and the ends thereof extend equally distant from the axis of the drive-shaft when the food rack is in operative position.

Operation

In using the invention, food particles 28 to be barbecued are impaled individually upon the spits 27, after which the food rack, loaded with the food particles, is positioned in the oven and secured in operative position on the drive-shaft as above described. The grid 11 is heated by the gas jets 13 and the food rack A is rotated by action of the motor, whereupon the food particles are subjected to heat radiated from the grid and the gas jets, so the entire surfaces of the food particles are subjected uniformly to heat and thus become roasted in sight of the operator and the patrons. The food rack is rotated preferably at approximately three revolutions per minute and the food particles are removed selectively after roasting by use of suitable tongs (not shown) as needed to be served. After the food particles have all been removed the rack may then be replaced by another loaded rack, whereupon the roasting operation is continued. Or, the emptied rack may be left in operative position and other food particles impaled on the spits while the rack is in motion and thus refill the rack to any extent desired to meet the extent of patronage.

Figure 2:
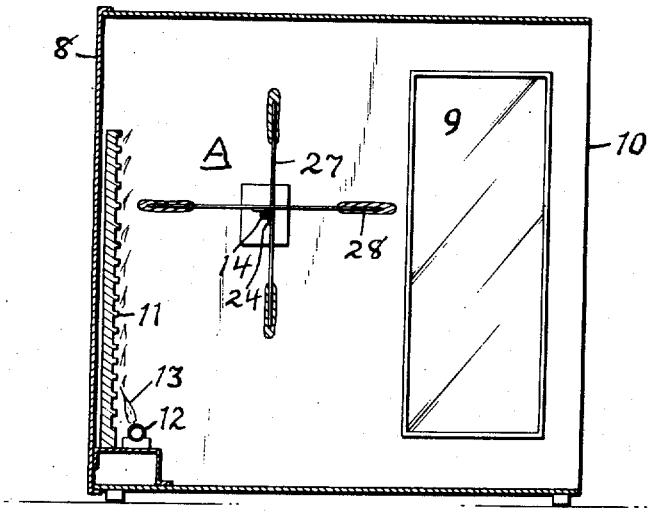
Fig. 2 is a side elevational view of the structure shown in Fig. 1 in section through a midportion thereof.
Figure 3:
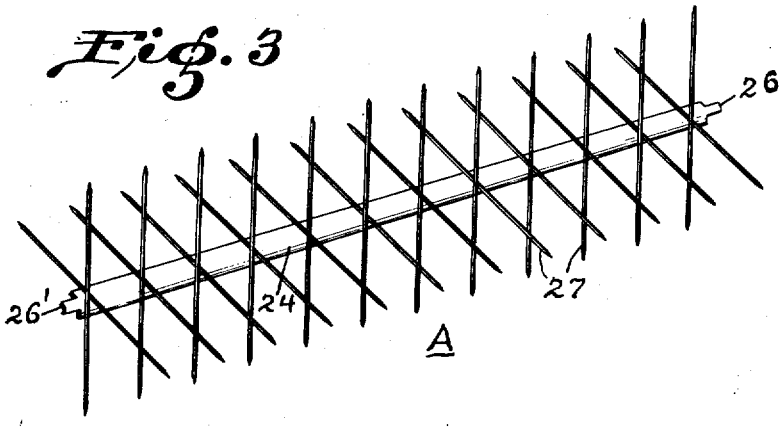
Fig. 3 is a perspective view of a removable rack on which the food particles are loaded.
Figure 4:
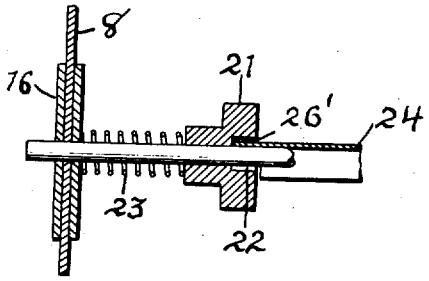
Fig. 4 is a detail side elevational view of a support for one end of the food rack, parts being in section.

*In the use of this invention as described in the foregoing, the food particles are evenly roasted throughout in an efficient manner. Two distinct heating media are provided, one of these media being constituted by convection flow of air upwardly in front of the grill 11, along the underside of the cover of the housing 8 and out of the front 10. As seen in Fig. 2, the revolving food particle is carried through the path of this flow and heated thereby for approximately one hundred eighty (180) degrees rotation of the spit.*

*The second of these media is radiant heat directed outwardly from the grill 11. This heat is uniformly applied to opposite sides of the food particles as they are rotated, it being observed in Fig. 2 that the left side of the uppermost food particle is exposed to radiation while the opposite side thereof will be similarly exposed when the particle swings downwardly one hundred eighty (180) degrees.*

*The conjoint application of these two heating media serves, as explained above, in the uniform and efficient external roasting of the food particles thereby constituting the present invention as a material contribution to the art.*

*In addition to the foregoing, it will be observed that the metallic spit arms are also exposed to the effects of this double heating whereupon heat is carried to the interior of the impaled food particles to cook them internally.*

Variations from the particular construction above disclosed may be resorted to by the exercise of skill in the art, without departure from the spirit or scope of the invention.

What I claim is:

1. A barbecue appliance consisting of a housing having glazed windows in its ends and an open front, a grid disposed in the back of the housing, heating means for the grid, a drive-shaft extending horizontally through the housing provided with bearings therefor in the ends of the housing, one end of said drive-shaft having secured thereon a pulley, a motor belted in connection with said pulley by which to activate the shaft, a chuck secured on one end portion of the drive-shaft located within the housing, a retaining lug loosely mounted on the opposite end portion of the drive-shaft provided with an annular recess, a compression spring concentric with the drive-shaft disposed between said lug and the adjacent bearing, and a food rack consisting of an angle-bar shaped to fit astride the drive-shaft, having thereon radially disposed spits arranged in pairs spaced apart and provided at its ends with tongues adapted for engagement respectively with the chuck and the retaining lug, so the food rack is rotated when the drive-shaft is actuated, said food rack being adapted to be inserted into operating position on the drive-shaft or removed therefrom by exerting end pressure of the food rack against the retaining lug.

2. A barbecue appliance consisting of a housing having an open front, a heater disposed in the back of the housing, a drive-shaft extending through the housing between the heater and the front thereof provided with means to activate it, a food rack having an angle bar disposed astride the drive-shaft and having locking engagement at the ends thereof with said shaft, and radially disposed spits secured on said angle bar adapted to have impaled thereon parcels of food, said food rack being adapted to be removed bodily or replaced with respect to the drive-shaft.

3. A barbecue appliance including a housing containing a heater disposed therein, a drive-shaft disposed within the housing provided with means to activate it, and a food rack removably locked in connection with the drive-shaft to activate the food rack, said food rack consisting of an angle bar disposed astride the drive-shaft and having secured thereon radially disposed spits upon which food particles to be roasted are impaled.

*4. A barbecue appliance including a housing having an upper portion which provides a region of heated air and containing a heater, a heat conducting drive-shaft disposed within the housing provided with means to activate it, and a food rack operatively connected to the drive-shaft, said food rack consisting of the drive-shaft having secured thereon radially disposed spits upon which food particles to be roasted are impaled, said spit being arranged with respect to said heater in such a manner that each particle of food will have two of its opposite sides directly exposed to the heat of radiation from said heater for one complete revolution of said drive-shaft, said spits being constructed of heat-conducting material which serves to roast the interior of the food particle impaled thereon during the roasting of the exterior thereof, said spits further being of such length as to carry the food particles through said region of heated air.*

*5. A barbecue appliance comprising a housing having top and side portions and an open front,*

*a heater mounted in said housing and providing a wall of radiant heat energy which is directed toward the central portion of said housing, said heater and said housing being so constructed as to produce a region of heated air adjacent the top side of said housing, said heated air continuously flowing from said open front adjacent said top side whereby that portion of the housing beneath the path of such flow is relatively cool so that an individual may insert his hand in such cool portion without being burned, a rotatable metallic shaft extending through the housing in substantially parallel spaced relation with said heater, and radially arranged metallic spits on said shaft which are connected to said shaft in such a manner as to provide heat-conductive connections therebetween whereby heat transferred to said shaft will be conducted to said spits, said spits thereby being rotatable in planes substantially normal to the radiating area of said heater, said shaft being located vertically below the path followed by said heated air as it leaves said front portion, said spits further being of such length that the outer end portions thereof will pass adjacent said region of heated air, whereby each food particle impaled on a respective spit will be subjected on its opposite sides to radiant heat from said heater for each revolution of the shaft and will have at least a portion thereof subjected directly to said region of heated air, each food particle also being cooked internally by the heat conducted to the respective spit.*

*6. A barbecue appliance comprising a housing having top and side portions and an open front, a heater mounted in said housing and providing a wall of radiant heat energy which is directed toward the central portion of said housing, said heater and said housing being so constructed as to produce a region of heated air adjacent the top side of said housing, a rotatable metallic shaft extending through the housing in substantially parallel spaced relation with said heater, and radially arranged metallic spits on said shaft which are connected to said shaft in such a manner as to provide heat-conductive connections therebetween whereby heat transferred to said shaft will be conducted to said spits, said splits thereby being rotatable in planes substantially normal to the radiating area of said heater, said shaft being so positioned vertically as to dispose the ends of said spits in said region of heated air, whereby each food particle impaled on a respective spit will be subjected on its opposite sides to radiant heat from said heater for each revolution of the shaft and will have at least a portion thereof subjected directly to said region of heated air, each food particle also being cooked internally by the heat conducted to the respective spit.*

*7. A barbecue appliance comprising a housing having top, back and side portions and an open front, a heater mounted in said housing and providing a wall of radiant heat energy which is directed toward the central portion of said housing, a rotatable metallic shaft extending through the housing in substantially parallel relation to said top portion and to the plane of said heater, said heater and said housing being so constructed as to produce a region of heated air adjacent the top side of said housing and also generally above said shaft, said top side and said open front being so related that said heated air will continuously flow out of said open front adjacent said top portion along the entire distance between said housing side portions, said shaft being disposed vertically below the path which said heated air follows in leaving said open front, and radially arranged spits on said shaft which are connected to said shaft in such a manner as to provide heat-conductive connections therebetween whereby heat transferred to said shaft will be conducted to said spits, said spits further being of such dimensions as to pass adjacent said region of heated air whereby each food particle impaled on a respective spit will be subjected on its opposite sides to radiant heat from said heater for each revolution of the shaft and will have at least a portion thereof subjected directly to said region of heated air, each food particle also being cooked internally by the heat conducted to the respective spit.*

*8. A barbecue appliance comprising a housing having top, back and side portions and an open front, a heater mounted in said housing and providing a wall of radiant heat energy which is directed toward the central portion of said housing, a rotatable metallic shaft extending through the housing in substantially parallel relation to said top portion and to the plane of said heater, said heater and said housing being so constructed as to produce a region of heated air adjacent the top of said housing and also generally above said shaft, said top and said open front being so related that said heated air will continuously flow out of said open front adjacent said top portion along the entire distance between said housing side portions, said shaft being disposed vertically below the path which said heated air follows in leaving said open front, and radially arranged spits on said shaft which are connected to said shaft in such a manner as to provide heat-conductive connections therebetween whereby heat transferred to said shaft will be conducted to said spits, said spits further being of such dimensions as to pass through said region of heated air whereby each food particle impaled on a respective spit will be subjected on its opposite sides to radiant heat from said heater for each revolution of the shaft and will be subjected directly to said region of heated air, each food particle also being cooked internally by the heat conducted to the respective spit.*

CHARLES R. LARKIN.

References Cited in the file of this patent or the original patent

UNITED STATES PATENTS

| Number | Name | Date |
|---|---|---|
| 611,595 | Alderson | Oct. 4, 1898 |
| 848,018 | Engelhard | Mar. 26, 1907 |
| 1,152,184 | Kluge | Aug. 31, 1915 |
| 1,702,900 | Humphrey | Feb. 19, 1929 |
| 1,740,729 | Garvis | Dec. 24, 1929 |
| 1,817,351 | Cookson | Aug. 4, 1931 |
| 2,182,225 | Garvis | Dec. 5, 1939 |
| 2,198,134 | Spiegl | Apr. 23, 1940 |
| 2,310,349 | Bobo | Feb. 9, 1943 |
| 2,470,645 | Reichart | May 17, 1949 |
| 2,477,183 | Humensky | July 26, 1949 |
| 2,502,685 | Warner | Apr. 4, 1950 |
| 2,520,067 | Sagen | Aug. 22, 1950 |

FOREIGN PATENTS

| Number | Country | Date |
|---|---|---|
| 5,625 | Great Britain | Mar. 13, 1908 |